United States Patent [19]
Stoneking et al.

[11] Patent Number: 5,982,390
[45] Date of Patent: Nov. 9, 1999

[54] CONTROLLING PERSONALITY MANIFESTATIONS BY OBJECTS IN A COMPUTER-ASSISTED ANIMATION ENVIRONMENT

[75] Inventors: Stan Stoneking, 8312 Leda Ct., Antelope, Calif. 95843; Brian C. Fries, Auburn, Calif.

[73] Assignee: Stan Stoneking, Antelope, Calif.

[21] Appl. No.: 08/823,440

[22] Filed: Mar. 24, 1997

Related U.S. Application Data

[60] Provisional application No. 60/014,056, Mar. 25, 1996.
[51] Int. Cl.$^6$ .................................................. G06T 15/70
[52] U.S. Cl. ........................ 345/474; 345/473; 345/957; 345/958
[58] Field of Search .................................... 345/949, 950, 345/955, 957, 473, 474, 958

[56] References Cited

U.S. PATENT DOCUMENTS

| | | | |
|---|---|---|---|
| 5,048,839 | 9/1991 | Hurst | 273/240 |
| 5,261,041 | 11/1993 | Susman | 345/473 |
| 5,347,306 | 9/1994 | Nitta | 348/15 |
| 5,498,003 | 3/1996 | Gechter | 463/31 |
| 5,517,663 | 5/1996 | Kahn | 345/473 |
| 5,524,195 | 6/1996 | Clanton, III et al. | 345/327 |
| 5,586,218 | 12/1996 | Allen | 706/12 |
| 5,736,991 | 4/1998 | Tada | 345/474 |
| 5,757,360 | 5/1998 | Nitta et al. | 345/156 |
| 5,867,175 | 2/1999 | Katzenberger | 345/473 |
| 5,883,639 | 3/1999 | Walton et al. | 345/473 |
| 5,894,310 | 4/1999 | Arsenault et al. | 345/433 |

OTHER PUBLICATIONS

Mowbray, TJ, Zahavi, R, "The Essential Corbra", John Wiley & Sons, Inc., (1995), Ch. 5 pp. 109–128.

Orfali et al., "The Essential Distributed Objects Survival Guide", John Wiley & Sons, Inc., (1996), Ch. 10 pp. 198–202, ISBN 0–471–12993–3.

Ford, W., "Computer Communications Security", Prentice Hall PTR, (1994), § 4.2 pp. 71–84, 130–143, ISBN 0–13–799453–2.

Schneier, "Applied Cryptography, 2nd Edition", John Wiley & Sons, Inc., (1996), § 3.3 pp. 56–65, § 18.12 455–59, § 24.5 566–72, ISBN 0–471–11709–9.

Weiying Chen, et al., "Active X Programming Unleased", (1997), Ch. 1 pp. 5–14, ISBN 1–57521–154–8.

Kraig Brockschmidt, Inside OLE, 2nd Edition, (1995), pp. iii–xviii, 3–52, 63–68, 73–82, 160–169, 187–190, 247–252, 269–274, 279–281, 539–551, 761–766, 1165–1194, ISBN 1–55615–843–2.

Ken Perlin et al., "Improv: A System for Scripting Interactive Actors in Virtual Worlds", *Computer Graphics Proceedings, Annual Conference Series*, 1996, pp. 205–216.

Karl Sims, "Evolving Virtual Creatures", *Computer Graphics Proceedings, Annual Conference Series*, 1994, pp. 15–22.

(List continued on next page.)

*Primary Examiner*—Kenneth S. Kim
*Attorney, Agent, or Firm*—Computer Law++

[57] ABSTRACT

A method and system support the definition, authentication, and enforcement of constraints on speech, appearance, movements, associations, and other properties that are used to suggest or exhibit the personality traits and behaviors of animated characters. The system includes a controlling object and one or more personality objects running in any of a wide range of software and hardware environments. Zero or more personality subobjects may be associated with each personality object. The methods provide steps for authenticating an object, controlling associations between objects and subobjects, controlling events involving one or more objects, controlling the proximity of personality objects to one another, controlling the distribution of objects, and mandating the use of auxiliary objects under specified circumstances.

32 Claims, 10 Drawing Sheets

OTHER PUBLICATIONS

John E. Chadwick et al., "Layered COnstruction for Deformable Animated Characters", *Computer Graphics*, vol. 23, No. 3, Jul. 1996, pp. 243–252.

Don Clark, "Microsoft and Netscape Locked in Battle To Make the Web More User–Friendly", *The Wall Street Journal*, date unknown.

Evan Ramstad, "Player vs. Player vs. Player vs. Player . . . ", *The Wall Street Journal*, Mar. 20, 1997, at R6, R15.

Jared Sandberg, "Talk, Talk, Talk", *The Wall Street Journal*, Mar. 20, 1997, at R4.

Don Clark, "Microsoft Will Describe Chip Project to Upgrade PCs", *The Wall Street Journal*, Aug. 6, 1996, at B4.

FutureSplash Animator from FutureWave, Jan. 8, 1997.

Autonomous Agents '97 Conference Program.

Moses Ma, "Avatars, Agents and Bots, Oh My!—Draft", *Avatar Definition*, no later than Jan. 17, 1997.

"'Living Worlds' Conceptual Overview", Dec. 4, 1996.

"'Living Worlds' Specification Code and Comments", Jan. 9, 1996.

"Adding Avatar support in VRML spaces", no later than Jan. 15, 1997.

"event", no later than Jan. 15, 1997.

"IDS supports Living Worlds Initiative", Integrated Data Systems, Inc., Oct. 31, 1996.

Brian Tung, "The Moron's Guide to Kerberos, Version 1.2", Dec. 19, 1996.

Horowitz, M., "Triple DES with HMAC–SHA1 Kerberos Encryption Type", Internet–Draft, Network Working Group, Nov. 1996.

Horowitz, M., "Key Derivation for Kerberos V5", Internet–Draft, Network Working Group, Nov. 1996.

"Kerberos: The Network Authentication Protocol", MIT, Dec. 20, 1996.

"Company Information", Associated Computing Inc., 1996.

"Parable Will Make 'South Park' One of Those Things", Wall Street Journal, B6, Jun. 4, 1998.

"Looney Tunes to Star in Web Ads in Warner Bros. Licensing Deal", Wall Street Journal, B10, Nov. 3, 1997.

"Steal This Brand", Wired, p. 68, Sep. 1998.

CONTROLLING PERSONALITY MANIFESTATIONS BY OBJECTS IN A COMPUTER-ASSISTED ANIMATION ENVIRONMENT

RELATED APPLICATIONS

This application is based on commonly owned copending United States Provisional Patent Application Ser. No. 60/014,056, filed Mar. 25, 1996.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

MICROFICHE APPENDIX

This application includes a microfiche appendix containing computer program listings that provide examples and details pertaining to the invention.

FIELD OF THE INVENTION

The present invention relates to the monitoring, protection, and control of animated personality objects, and more particularly to the definition, authentication, and enforcement of constraints on speech, appearance, movements, associations, and other properties that are used to suggest or exhibit the personality traits and behaviors of object-based characters within a computer-assisted animation environment.

TECHNICAL BACKGROUND OF THE INVENTION

Visual images can have enormous impact on people. As a result, a variety of technologies have been developed to create and manipulate images with the assistance of a computer. Indeed, the field of computer graphics has been and still is one the most intensively pursued branches of computer science, both by theoreticians and by working engineers. Within computer graphics, numerous specialties have emerged, including scientific visualization, rendering methods, animation methods, CAD/CAM, fonts, three-dimensional graphics, and image processing.

Past innovations in computer hardware and software help manage the complex information and support the extensive computations required to render and manipulate images, and new developments continually emerge. Many successful and prominent companies, such as the Evans and Sutherland Computer Corporation, Silicon Graphics, Inc., and Pixar, Inc., specialize in continually improving computer graphics systems.

Unfortunately, different graphics systems do not communicate readily with one another. The database of files that contain information needed to create and manipulate computer graphic images contain a wide variety of different types of information, including point positions, interpolation curves, palettes, colors, light vectors and strengths, texture maps, key frames, and so forth. Information used by one graphics system will not necessarily be available in another system. Sometimes the information is present but is stored in an incompatible or proprietary format. Some progress has been made at defining standard interfaces for accessing and manipulating graphics information, but much work in this area remains to be done.

In short, computer graphics is a large and active industry which focuses on the efficient and rapid manipulation of large amounts of data to produce visual images. People who design and implement graphics systems have very limited time, opportunity, and reason to exchange specific technical ideas with people working in other computer-related industries such as networking, encryption, or business applications such as character licensing and merchandising.

The problem of managing complexity is not limited to computer graphics, but appears in many different forms throughout computer science. As a result, programming languages and other elements of a computing environment provide a wide variety mechanisms for organizing the potentially enormous amount of information required to create a useful working program.

One important type of complexity management mechanism provides some degree of "modularity" or "encapsulation" that separates code into individual components. The various components communicate with one another through some type of interface. Each component hides from the other components certain information that is only used locally by the hiding component, so that the effect of changes to local information is limited as much as possible.

Encapsulation mechanisms specific to a given programming language include Ada packages, Pascal units, Modula-2 modules, C++ objects, and many others. Functions and procedures are used to encapsulate code in a host of programming languages. Other encapsulation mechanisms are typically discussed in connection with the computer hardware or with the operating system software that manages hardware resources; these include interrupt handlers, semaphores, threads, tasks, and processes.

One form of encapsulation which has recently gained in prominence is the use of "objects" or "object-oriented programming." One approach to object-oriented programming relies on a "Component Object Model" ("COM"). COM is described generally in *OLE 2 Programmer's Reference*, Volume One, ISBN 1-55615-628-6 and in K. Brockschmidt, *Inside OLE*, second edition, ISBN 1-55615-843-2.

COM defines "component objects" which encapsulate pieces of functionality and make them available for use by "clients." Clients determine what services are available from a component object, and what information those services require and produce, by investigating the component's interface(s).

One version of COM is called "OLE." A wide variety of OLE software components, OLE controls, OLE automation objects, OLE automation controllers, OLE-enabled applications, OLE graphic objects, and related tools are commercially available. A *Directory of OLE Components for Visual Development* is available from Fawcette Technical Publications of Palo Alto, Calif. Those of skill in the art will recognize that other approaches to object-oriented programming include the Java programming language, and the OpenDoc, Common Object Request Broker Architecture ("CORBA"), and NextObjects approaches.

Conventional object-oriented tools and methods are not well-suited to the creation and control of animated characters. Conventional approaches also fail to address the problem of managing personality manifestations of such characters.

As used herein, "animated characters" are recognizable sequential presentations of a character that are created with the assistance of a computer. Individual still images may be created from animations by "screen dumps" or the like, but animation typically involves more than just an image. Animation includes a coordinated sequence of bitmaps or other audio/visual renderings which portray character activity in a computer-generated environment. Coordination may be achieved by key frames, kinematics, or dynamic simulation, or by traditional animation techniques borrowed from the film industry, such as deformation.

Animation may include images, sounds, or both. It may be two-dimensional, or it may present the illusion of occurring in a three-dimensional environment. Environments may be defined according to standards such as the VRML, Living Worlds, and/or Open Community standards, and others. Animation images are drawn on a computer screen or other display device based on data being retrieved from a computer system's memory.

Animated characters may be avatars which represent humans; they may be agents or other representations of fictional characters; or they may be autonomous creations such as "Bots" or "intelligent agents." For instance, an avatar representing a player in a multi-user interactive game, an animation of Santa Claus squeezing through a chimney, and an animation representing an operating system file manager may each embody an animated character.

Interaction between animated characters, between portions of a character, between characters and objects in the environment, and between characters and humans, is of particular interest here. In theory, character representations should not be limited to simple bitmaps or vectors in paint programs, browsers, or other applications, but should also be able to roam through a diverse and sometimes unpredictable computer-generated environment, using character embodiments based on Java applets, OLE components, agents, avatars, or the like. During these travels, animated characters would encounter one another, computer-generated buildings, tools (guns, telephones, magic wands, and other items with real or imaginary counterparts outside the computer-generated environment), events (absence or presence of other characters or tools, or actions by other characters), and numerous other opportunities for real-time interaction.

However, there are no satisfactory means known to guide such interactions so they conform with and reflect the personalities of the characters. A malign character may masquerade as a trusted personality object, leading objects to cooperate and interact with the masquerading object in unintended ways. A user, either directly or indirectly, may tamper with the content of messages passed between objects and may produce effects similar to masquerade. A malicious programmer may create a lewd scene using the likeness of a popular personality.

Subject to the limits imposed by respect for free speech, it would therefore be useful to place limits on character interactions. Some limits are already imposed by legal means independent of the technology. Although many animated characters lie wholly in the public domain and can thus be manipulated at will without legal liability, other characters include protected intellectual property and/or are associated with the reputation of a particular individual or business. Unauthorized manipulation of such proprietary animated characters can damage the public image or commercial prospects of the characters' owners.

In one case, for instance, a court recognized that an "underground" comic book which placed several well-known and wholesome Disney cartoon characters in a promiscuous, drug-ingesting context completely at odds with their personalities thereby violated Disney's rights. However, the relatively high cost of legal actions discourages many character owners from bringing suit to protect their rights.

One approach to controlling character interaction is to script all interactions in advance. This is the approach taken in films and plays, novels, comic strips, animated debuggers, user interfaces, and many simulations. Even if some "audience" input is allowed during the "performance," the set of possible outcomes is severely restricted and largely predetermined. This approach is not suitable for fully automated environments, where a human playwright, director, or the like is not available. The requirement of constant direct human supervision makes this approach uneconomical as well as impractical for many situations. This approach may also inhibit spontaneity and real-time response.

Another approach which relies heavily on direct human control of interactions is used in video games, interactive games and simulations, mediated war games, fantasy games, role-playing games, and the like. In these environments the animations are avatars whose behavior is controlled mainly by human players, subject to the result of events such as weapon hits and available resources such as spells. The need for constant direct human supervision makes this approach unsuitable for controlling numerous and wide-ranging autonomous animated characters.

Another approach allows characters to interact with one another by modifying one another's properties (courage, intelligence, charisma, and so forth) through a common or shared memory area such as a blackboard. However, the characters are implicitly assumed to be under the indirect control of a single human author (or a small group of authors who trust one another), so no restrictions are placed on access by one character to another character's properties. This approach does not scale well to interactive computer-generated environments which may contain characters scripted by humans that never meet or communicate directly, characters which have never previously interacted, and/or malicious characters.

A different approach allows characters to interact with one another and with their environment by sensing contacts or collisions with one another and with the environment. However, this approach merely determines whether contact has occurred; it fails to take into account the respective personalities of the characters. A contact between a first character and a second character is treated the same by the first character as a contact between that character and a wall or other obstacle.

Some autonomous agents have limited input and output connections to computer-generated environments through one or more sensors and effectors, and a limited ability to learn through interaction with that environment. However, such agents are not integrated with computer animations. They are also not well-suited for real-time interaction with the environment and with animated characters in a way that manifests a personality readily apparent to humans. Indeed, like many other computer programs, such agents are fairly described as "impersonal" and "mechanical."

Some recent approaches recognize the need for rules governing interaction between animated characters, their environment, other animated characters, and users. The need to protect against malicious characters has also been noted recently. But the precise constraints needed have not been set forth, and no detailed means are described which would enable one of skill in the art to provide suitable constraints on interaction.

Thus, it would be an advance in the art if the benefits of object-oriented programming could be combined with computer graphic techniques to provide objects which animate characters in novel ways.

It would be a further advance if manifestations of the personality of such animated characters could be managed and monitored by a suitably programmed computer in order to cost-effectively protect and promote those personalities.

It would also be an advance if character interactions were subject to authentication.

It would be a further advance if the results of contact between two characters depended at least in part on the personalities of the characters.

Such a method and system for controlling animated characters are disclosed and claimed herein.

BRIEF SUMMARY OF THE INVENTION

Animated characters are extremely versatile and capable of being used in many creative and unexpected ways. Animated characters may be embodied in, or based on, toys, cartoon characters, celebrities, historical figures, comic book characters, literary figures, political figures, and corporate mascots.

The present invention provides a control mechanism which ensures that an animated character in the form of a personality object maintains a consistent character, does not interact with other objects in undesirable ways, adheres to moral guidelines, and does not compete with itself across multiple licensing agreements. Without such protections, owners of proprietary character personalities are justifiably concerned about the risk of potential exploitation or misuse of those personalities.

This concern denies animated character owners potentially large marketing revenues and exposure avenues. It also inhibits the extraordinary potential of character personalities in entertainment, education, communication, and advertising. The present invention provides a means for controlling animated characters during their use by typical end users. The present invention will not protect against all possible misuses, but would often be more cost-effective and less intrusive than legal action.

Toward these ends, the present invention provides a method and system for encapsulating the personality traits and behaviors of characters into digital objects that can be used in a computer-assisted animation environment. The invention also defines methods by which these personality traits and behaviors will be enabled, authenticated, enforced, and distributed within a computer-based animation system. Objects defined according to the present invention are referred to herein as "personality objects."

The present invention provides an architecture, in a format readily understood by those of skill in the art, which allows personality objects to accept or reject actions, interactions, behaviors, modifications, speech, environments, and other requests. The present invention supports digital definition of personality traits for personality objects, such as object actions and interactions, styles, speech, moralities, and other behavioral properties. Acceptance, provisional acceptance, and rejection of requests is based upon personality definitions embedded in a personality object.

One computer system implementation of the architecture includes a controller object. The controller object helps supply personality objects with semantic and contextual information about the environment and other objects in the environment. Personality objects define their semantic and contextual standards and the controller object helps enforce those standards. The controller object also helps prevent security breaches.

In operation, an object or user requests that a personality object or subobject enter a scene. A scene includes one controller object and any number of personality objects. The personality object is authenticated by the controller object. A security context is created which provides tools for authenticating message origins and promoting data integrity.

The personality object registers its identification, personality standards, and security requirements with the controller object. Each resident personality object assigns the incoming personality object an access level after examination of the incoming object's standards, ID, authentication, and security requirements. Optionally, any resident personality object may veto entry of the incoming personality object. Likewise, the incoming personality object assigns an access level to each resident object, or may optionally refuse to enter the scene. The controller object helps enforce personality standards, security levels, and provisions.

In summary, the present invention helps companies and individuals to protect and control the distribution and use of animated characters, including without limitation the use of subject matter which may be protectable under copyright, trademark, trade dress, or other laws. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
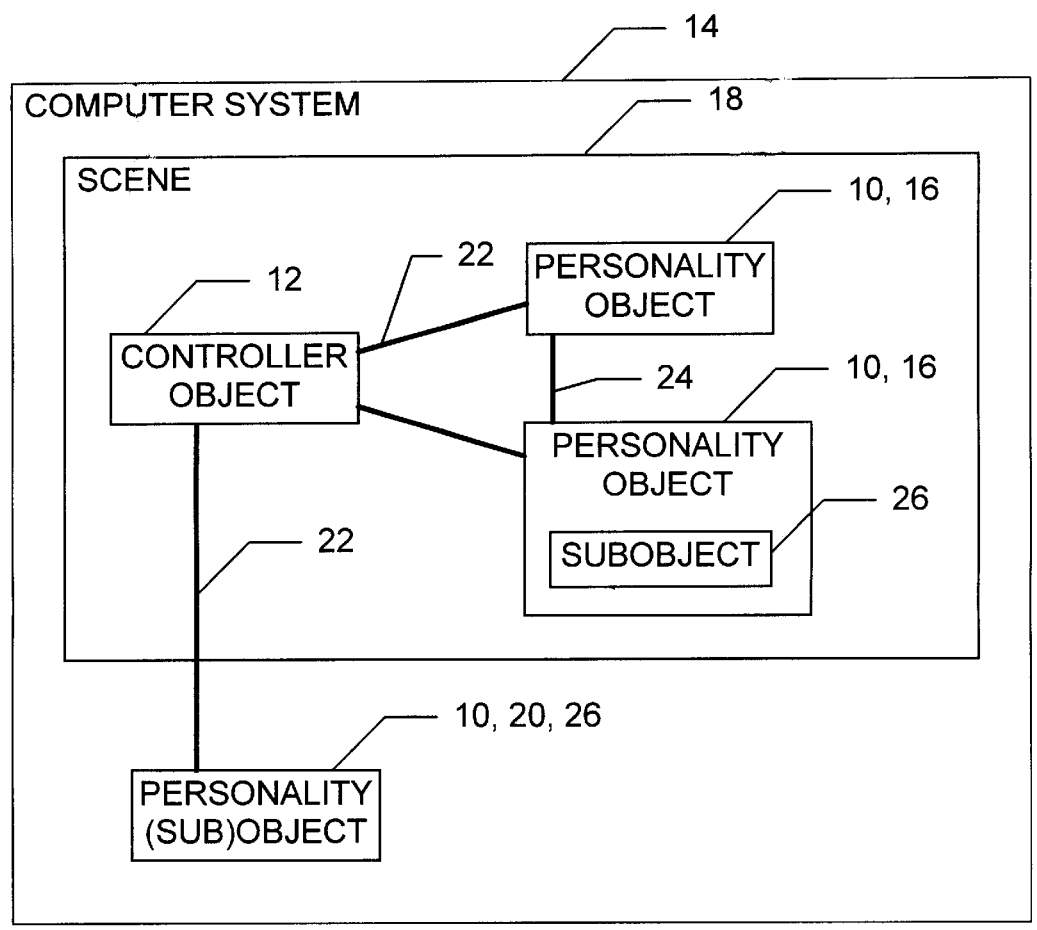
FIG. 1 is a diagram illustrating a computer system which is one of many systems suitable for use with the present invention.

The present invention provides an architectural specification that allows owners of animated characters to control their use, distribution, interactions, environments, and associations across multiple computer platforms, networks, and application programs in the form of personality objects. Several personality objects 10 and a controller object 12 on a computer system 14 are illustrated in FIG. 1. The controller object 12 and two of the personality objects 10, 16 appear in a scene 18, while a third personality object 10, 20 seeks entry to the scene 18.

The scene 18 may include a distributed virtual environment such as a MUD (multi-user dungeon) environment or another environment that is instantiated on multiple machines in a computer network. The personality objects 10 that are controlled by the controller object 12 may reside on different machines in the network.

Environmental controls may be either physical or virtual. Physical controls limit the activities of personality objects based on parameters such as the kind of computer, the application, or the kind of network being used as part of the system 14. Virtual controls limit activity based on whether the personality character 10 would appear in an urban scene 18, a prehistoric scene 18, and so forth.

Related Technologies

Because a personality object 10 is, in general, independent of platforms, languages, applications, and network protocols of the system 14, the present invention defines an architecture which is not limited to a specific computing environment. The present architecture is preferably independent of (and thus suitable for use with) a variety of component technology specifications such as OpenDoc, OLE, CORBA, COM, ActiveX, and SOM; programming languages such as C, C++, and Java; application programs such as Photoshop, Microsoft Office, and Strata tools; operating systems such as MacOS, UNIX, and Windows 95; security and authentication transaction methodologies such as public key, key escrow, Kerberos, Internet Generic Security Service, and others, including those providing level C2 or better security; communications or networks protocols such as HyperText Markup Language, TCP/IP, and ATM; and graphic and animation technologies such as Virtual Reality Markup Language, QuickDraw3D, Moving Worlds, and Out of This World. The trademarks used herein are marks of their respective owners. Embodiments of the present invention may employ one or more of the above enabling technologies, as well as similar technologies that become available in the future.

Some aspects of the present invention resemble services provided by an Object Request Broker ("ORB") as defined by the Object Management Group. An ORB brokers requests and interactions of distributed objects by use of access control lists and capability lists. Access control lists are used to limit the access of an object to any computer resource. Capability lists are used to limit user requests. An ORB also provides authentication services so client and server objects have reliable knowledge of each other's identity. Typical ORBs that are available commercially or academically included Orbix (Iona), ObjectBroker (Digital), SOM (IBM), XShell (Expersoft), and DOE (Sun). Access tokens have also been used previously, for purposes other than the methods of the present invention.

Although portions of the present invention may be implemented using an ORB, the present invention provides control over personality manifestations which is not provided by conventional ORBs. The present invention also preferably places minimal requirements on personality objects 10 in order for them to work with objects 10 that contain restrictions. For example, a given personality object 10 might not carry any restrictions. However, that personality object 10 must be able to provide reasonable identification to other personality objects 10 that do carry restrictions. If identification is not provided, personality objects 10 with restrictions may disallow any interactions with the given personality object 10.

In one embodiment, the present invention extends standard ORB implementations to provide security services that are specific to the control, protection, and promotion of personality objects 10. In addition to the authentication and controlled access provided by some ORBs, embodiments of the present invention also provide association control, proximity control, interaction control, distribution control, and provision fulfillment, as discussed in detail herein.

Communication

FIG. 1 shows communication channels 22 between the controller object 12 and personality objects 10, as well as a communication channel 24 between two personality objects 10. The communication channels 22, 24 between objects 10, 12 should be both secure and relatively transparent. A secured communication channel provides safeguards against tampering with communication contents or allowing personality objects 10 to gain direct memory access to one another without permission.

The invention does not require any specific protocol for achieving this end. For some developers, "secure" may be defined as merely inconvenient for a typical personality object user to overcome. On those grounds, developers may take no precautions regarding communication channels 22, 24 since standard compiling and linking technologies already provide adequate levels of inconvenience for average users. An alternative approach according to the invention is described herein for personality objects 10 with higher security needs.

As noted, the invention may use a distributed object architecture such as CORBA or the "Component Object Model" ("COM"). In particular, the Object Management Group—Interface Definition Language is well suited for providing the necessary communication channel security. The OMG is an industry consortium whose goal is to set interface and interoperability standards; the OMG is responsible for CORBA. The OMG-IDL specifies a communication channel infra-structure suitable for channels 22, 24 that provides the following services:

Transparency: Clients may invoke server communication using the syntax of standard local function calls, whether the personality object 10 exists locally or on a networked machine.

Secure Channels: An Object Request Broker (ORB) performs secured message passing between objects 10, 12. In the context of the invention, the controller object 12 could be a special case (or even subclass) of an ORB.

Language Independence: Vendors have implemented IDL mappings to many languages such as C/C++ and SmallTalk.

Cross Platform Design: OMG-IDL is a universal notation for specifying software boundaries and hiding operating system specifics.

Peer to Peer: Objects 10, 12 can alternate between client roles and server roles. The object 10, 12 is in a client role when it initiates an object invocation. It is in the server role when it receives the invocation and performs requested services.

Support Class Inheritance: This facilitates object reuse. Using the OMG-IDL, a controller object can be implemented by subclassing an existing ORB.

Network Savvy: A distributed environment is defined that hides differences between languages, operating systems, and object location. Contextual information, such as information about the user or operating system are provided in function calls.

The implementation details of OMG-IDL and CORBA are commercially available. SOM (System Object Model) from IBM, and ORBIX by IONA Technologies are examples of commercially available products implementing the OMG-IDL. Reference may be had to "The Common Object Request Broker: Architecture and Specifications," Object Management Group, John Wiley & Sons, Inc., 1992.

The architecture of the invention strongly discourages communications that allow direct memory access, such as giving a pointer of one object 10, 12 to another object 10, 12. Direct memory access provides the potential for direct invocation of protected object methods and tampering with object data. A completely secure architecture implementation could run under an operating system that enforces a protected memory environment starting at the CPU and kernel level. Unfortunately, most current personal computers support a shared memory environment. In such an environment, obtaining direct memory access is merely an inconvenience for a determined and malicious programmer.

If direct memory access is used by an embodiment of the invention, controller objects 12 should follow certain security guidelines. First, only the controller object 12 is provided direct memory access to other objects 10 and critical resources of the system 14. Some controller objects 12 may relax this requirement and allow direct personality object 10 to personality object 10 referencing, such as over channel 24, if both personality objects 10 agree via brokered communication to permit such an exchange.

However, under no circumstances should a controller object 12 provide another object a direct reference to the controller object 12. It is also recommended that the controller object 12 encrypt highly sensitive data that might allow a snooping personality object 10 or malicious controller object 12 to gain direct, unauthorized access to another object 10, 12 or critical computer system 14 resource.

Subobjects

A typical personality object 10 may be constructed from multiple personality subobjects 26, sometimes referred to as object layers. Examples of subobjects 26 include those which embody a character's voice, clothing, poses, animated actions, facial expressions, "intelligent" behaviors, and personal items such as a sword or purse. The expression of the personality object 10 as a whole depends on the parts, or subobjects 26, which the object 10 comprises.

Personality subobjects 26 may be produced by independent creators who wish to control the use and distribution of the personality subobjects 26. Likewise, the owner of the personality object 10 may want control over which personality subobjects 26 it integrates into its personality object 10. In most cases a personality subobject 26 and a personality object 10 have the same needs for control. With respect to control, the terms "object" and "subobject" are used interchangeably herein unless expressly stated otherwise.

Controller Objects

In one embodiment, the controller object 12 is functionally similar to an Object Request Broker, and may be implemented using an ORB modified according to the teachings herein. The controlling object 12 in a given environment 18 is preferably the ultimate broker and arbitrator of object 10 interactions in that environment 18. The controlling object 12 assists interaction of objects 10 and subobjects 26 and helps enforce restrictions. Objects 10 and subobjects 26 do have the innate power to refuse interaction by simply not responding to commands. The controlling object 12 also carries out requirements, called "provisions," such as forcing the display of a visual watermark in all scenes 18 in which the personality object 10 appears.

Because of the pivotal role of the controlling object 12, it is typically granted special authority such as decryption keys. For example, a company may wish that its well known personality object 10 only appear in applications that contain an authorized controlling object 12. The authorized controlling objects 12 would then be given the necessary decryption keys to use the personality object 10.

A wide variety of suitable encryption methods are known in the art, including the Digital Encryption Standard. This encryption method and many other suitable methods, including digital signature methods, are discussed in *Applied Cryptography* by Bruce Schneier, ISBN 0-471-59756-2, John Wiley & Sons 1994.

Authentication Generally

Before an object 10 can make any meaningful restrictions, it must receive critical information about other pertinent objects 10, 12 in the scene 18. It also must have reasonable assurance that the information provided by another object 10, 12 is correct, for instance, that the other object 10, 12 is indeed what it says it is. The present invention specifies an architecture for this authentication process and also specifies identification information that is common to all objects 10.

Figure 2:
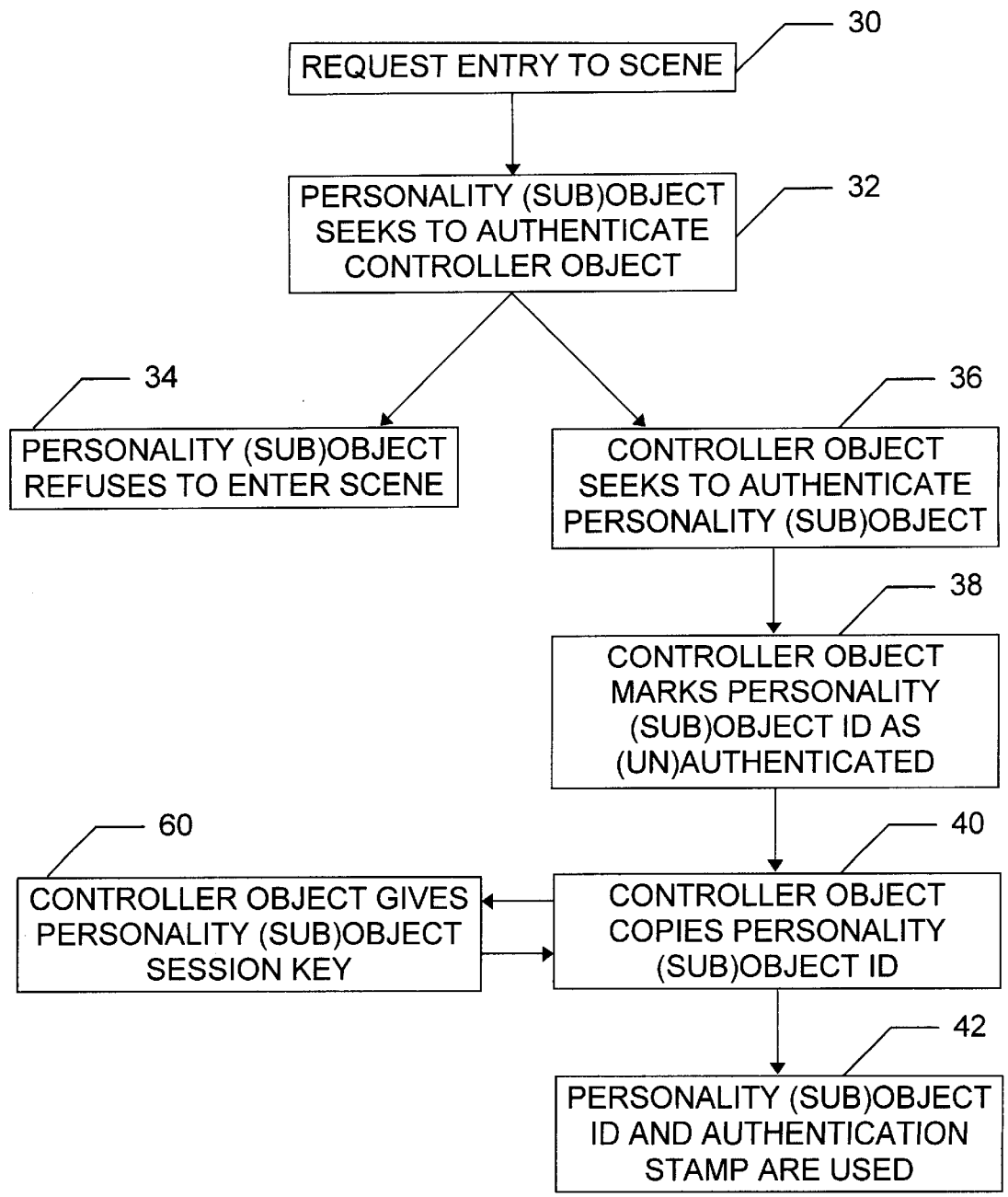
FIG. 2 is a flowchart illustrating an authentication method of the present invention.
Figure 3:
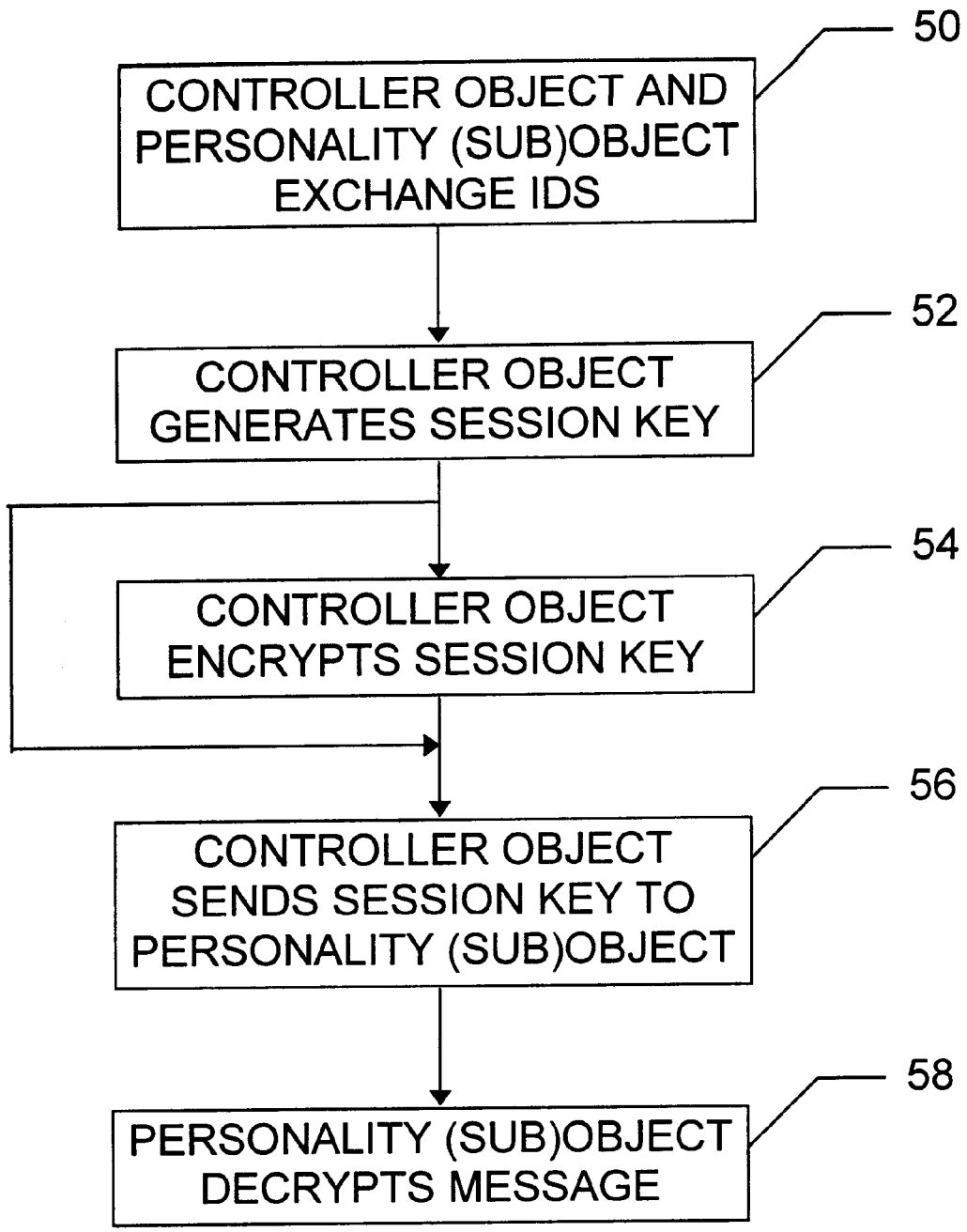
FIG. 3 is a flowchart illustrating a session key generation method of the present invention.

In one embodiment, authentication is optional depending on settings specified in personality objects 10 and the controller object 12. In general, authentication proceeds according to the method below, which is illustrated in FIG. 2. Here, as elsewhere, reference is made both to a particular Figure of current interest and to the background information shown in FIG. 1.

1. During a step 30, a user (or an object 10, 26 acting on behalf of a user) makes a request to add a personality (sub)object 10, 26 to the scene 18.
2. During a step 32, the incoming personality object 20 requests authentication of the controlling object 12.
3. If the controlling object 12 is not authenticated ("unauthenticated") then the incoming personality object 20 may choose to refuse entry by a step 34. The personality object can enforce this decision by refusing to perform any action and/or by maintaining critical information in an encrypted form.
4. If the controlling object 12 is authenticated, it requests authentication of the entering personality object 20 during a step 36. In an alternative embodiment the order of authentication is reversed.
5. If the personality object 12 is not authenticated during step 36 then the controlling object 12 marks the ID information of the incoming personality object 20 as "unauthenticated" during a step 38. Otherwise the ID information is marked as "authenticated."
6. The controlling object 12 makes a local copy of the personality object's ID information during a step 40 and assigns a session index during a step 60.
7. During subsequent step 42, the controlling object 12 adds the ID information and an "authentication stamp" to all events and interactions initiated by the personality object 20.

As stated, the invention does not depend on specific details of any given security protocol. Alternate security protocols may be used as long as they support the requirements set forth herein. Suitable protocols include Kerberos and GSS (Generic Security Service). These protocols support public and private key encryption, one way hash functions, and token generation and verification.

Authentication control according to the invention preferably requires relatively high levels of security for relatively infrequent steps such as initial authentication of the controlling object during step 32 and somewhat lower (less computationally intensive) security levels for more frequent steps such as authentication stamp generation during repetitions of step 42. The invention also provides for the possibility of allowing an unauthenticated object 20 to gain access to a scene 18. From the user's perspective, the unauthenticated object 20 may be just as important as the authenticated object 20.

Session Key Production and Authentication

A particular implementation of the method shown in FIG. 2 will now be described, with reference to FIGS. 1 through 4. According to one method of the invention, session key production and authentication proceed as follows. During the step 30, a request is made to add a personality object 20 to the scene 18. The scene 18 contains at least one controller object 12 and any number of personality objects 10. A reference to the personality object 20, such as a pointer to the object 20, is given to the controller object 12.

Next, the personality object 20 and the controller object 12 authenticate each other. The controller object 12 has secure independent access to a data base containing names of personality objects 10 and corresponding public keys. This database may be maintained locally or it may be retrieved from a network connection of the system 14. The personality object 20 has authenticated access to a list of trusted controller objects 12 with corresponding public keys.

During steps 50 through 58, the controller object 12 generates a secret transaction session key $K_s$, encrypts it, and sends it to the personality object 20. One suitable method for generating the key is described in Kohnfelder, "Toward a Practical Public Key Cryptosystem," Bachelors Thesis, MIT Department of Electrical Engineering, May 1978. Other key generation techniques are found in Schneier, Applied Cryptography, and other sources available to those of skill in the art. The secret key $K_s$ serves as a secret password shared only by the personality object 20 and controller object 12 for the current interaction session.

One method for generating the key $K_s$ proceeds as follows. During the step 50, the personality object and controller object 12 exchange identifications, $ID_{PO}$ and $ID_{CO}$. The IDs give each object 12, 20 the information needed to retrieve the other object's public encryption key.

During steps 52 through 56, the controller object 12 generates the random session key $K_s$, encrypts it using the personality object's public key, and sends it to personality object 20. During step 58, the personality object 20 decrypts the controller object's message, using the personality object's private key to recover the session key $K_s$. Since only the personality object 20 has the private key to decrypt $K_s$, the key $K_s$ is now a unique secret session key (security context/password) known only by the personality object 20 and the controller object 12. The key $K_s$ is saved by both objects for later use in authenticating transactions and ensuring message integrity.

If a key $K_s$ cannot be generated for some reason, both the controller object 12 and personality object 20 mark each other as "unauthenticated." The personality object 20 and controller object 12 both have the right to refuse interaction at this point. Otherwise, during step 56 the controller object 12 gives the personality object 20 a random, unsecured session key $K_u$, which is used to generate authentication stamps if the personality object 20 requests such stamps.

During the step 36, the controller object 12 authenticates the personality object 20. This may be accomplished according to the teachings herein in combination with techniques familiar to those of skill in the art, such as the techniques described in "Research and Development in Advanced Communication Technologies in Europe, RIPE Integrity Primitives: Final Report of RACE Integrity Primitives Evaluation (R1040)," RACE, June 1992.

Figure 4:
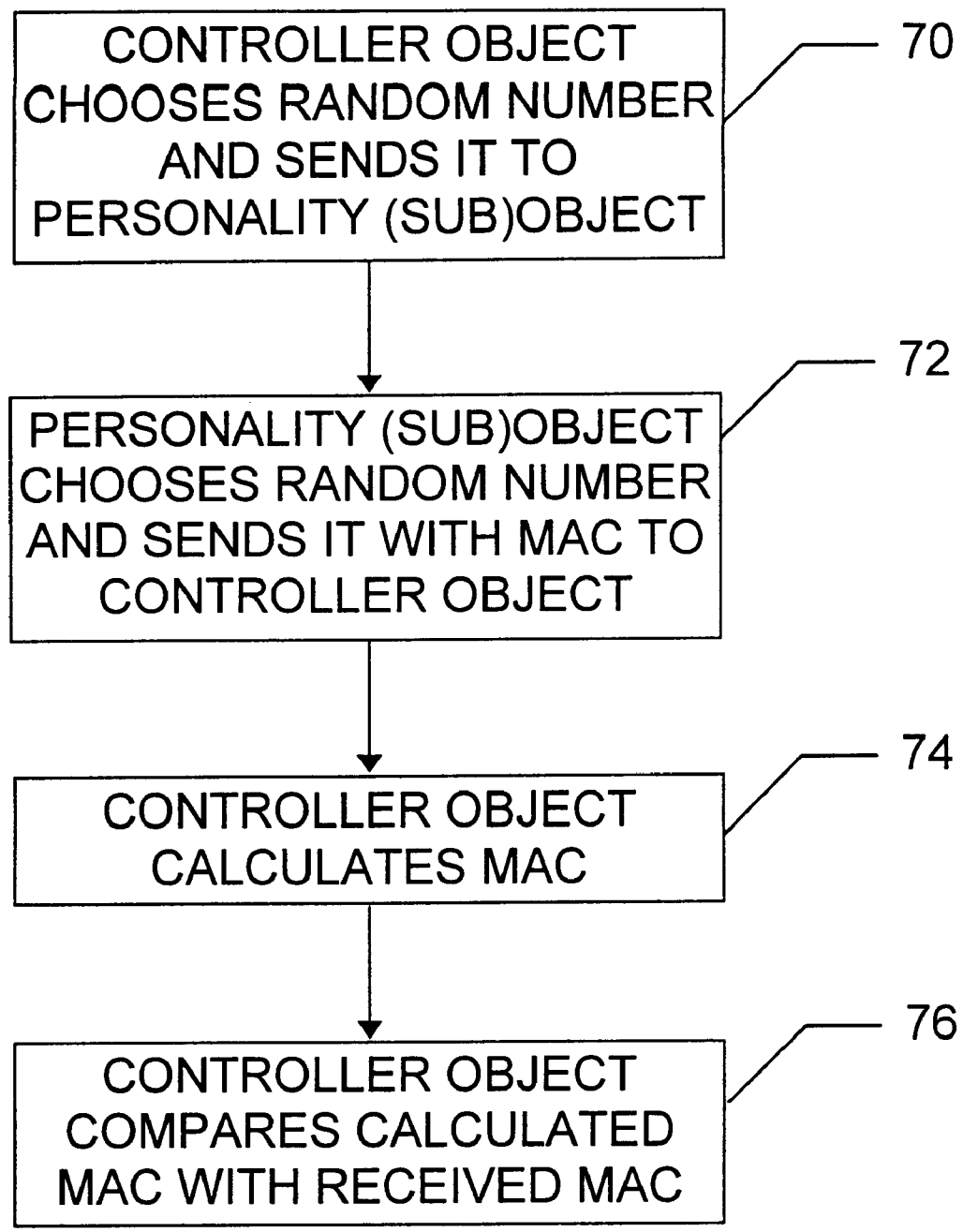
FIG. 4 is a flowchart further illustrating the method shown in FIG. 2.

According to a method shown in FIG. 4, during a step 70, the controller object 12 chooses a random 64 bit number $R_{CO}$ and sends it to the personality object. During a step 72, the personality object 20 chooses a random 64 bit number $R_{PO}$ and sends it to the controller object 12 along with a Message Authentication Code (MAC). The MAC is a one-way hash function $MAC_{PO}=Hash(K_s, R_{CO}, R_{PO}, ID_{PO})$, where $ID_{PO}$ is the ID information of the personality object 20 (or predetermined portions thereof). Suitable one-way hash functions are described in ISO/IEC 9797, "Data Cryptographic Techniques-Data Integrity Mechanism Using a Cryptographic Check Function Employing a Block Cipher Algorithm," International Organization for Standardization, 1989, and other public sources.

During a step 74, the controller object 12 uses the $R_{PO}$ to independently calculate the MAC, as $MAC_{CO}=Hash(K_s, R_{CO}, R_{PO}, ID_{PO})$. If $MAC_{CO}$ is equal to $MAC_{PO}$, then the personality object 20 is authenticated during a step 76; otherwise it is unauthenticated. During step 32, an incoming personality object 20 authenticates the controller object 12 using the same method as that shown in FIG. 4. Resident personality objects 16 are given the opportunity to accept or reject entry of the new personality object 20, regardless of whether that new personality object 20 is authenticated.

During step 42, the controller object 12 adds the session index (from its local copy) and an authentication stamp to all brokered transactions between two or more personality objects 10. The controller object 12 may use the ID information to enforce the roles declared by objects 10. For example, if a personality object 10 gives an ID declaring that it is an inanimate object 10, the controller object 12 may refuse to allow that personality object 10 to initiate events.

Authentication Stamps

Figure 5:
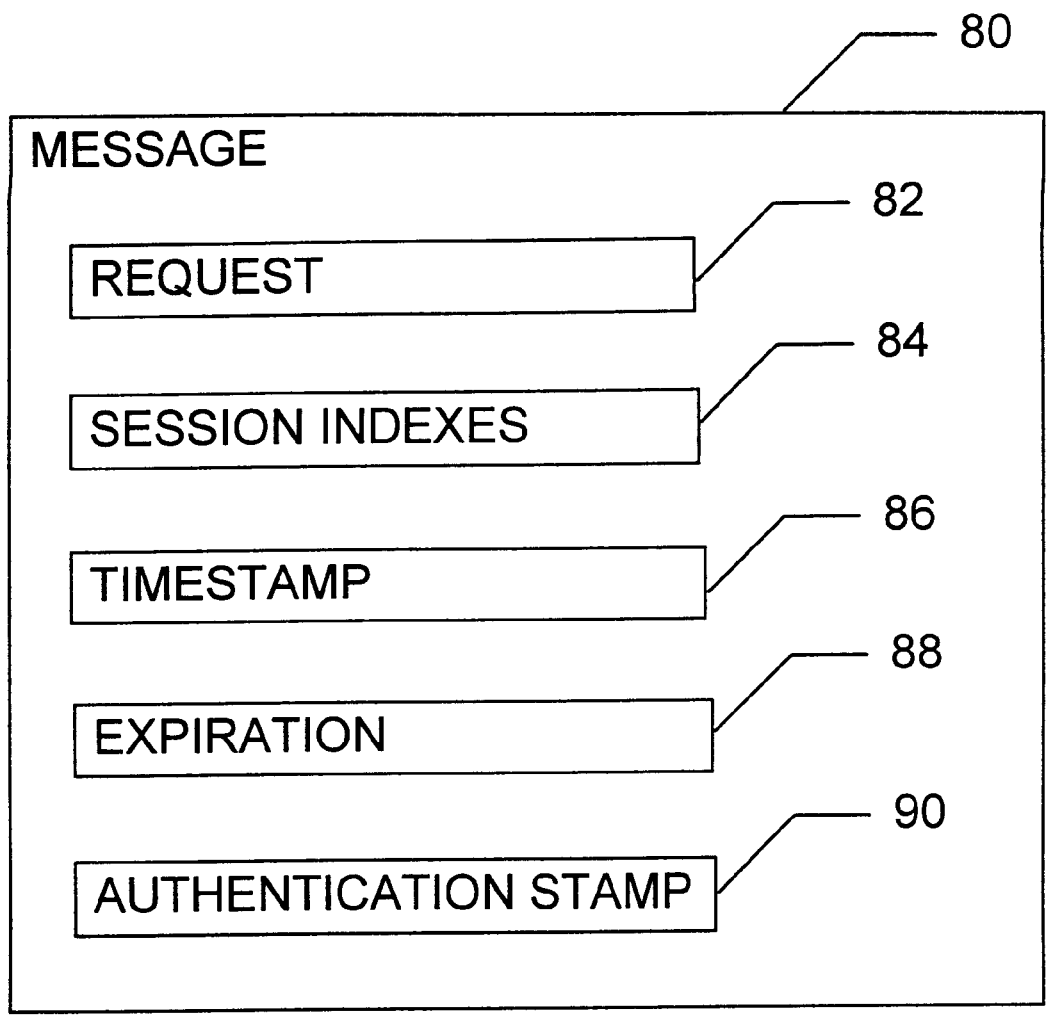
FIG. 5 is a diagram illustrating a message according to the present invention.

FIG. 5 illustrates one format for messages between objects 10, 12. In the illustrated embodiment, a message 80 between objects 10, 12 contains the following pieces of information: a message request 82, session indices (keys) 84 of all requesting objects 10, 12 in the current event chain, a time stamp 86, an expiration 88, and an authentication stamp 90. The time stamp 86 and expiration 88 are optional.

If the controller object 12 wishes to send an authenticated message to a personality object 10, it uses the following protocol to create an authentication stamp 90. The controller object 12 produces a one-way hash $H_{CO}$ of the information contained in the message request 82, session indices 84, time stamp 86 (if present), and expiration 88 (if present). The controller object 12 encrypts $H_{CO}$ with the shared secret session key $K_s$ to produce the authentication stamp $A_{CO}$ 90. Optionally, if the personality object 10 is unauthenticated, $H_{CO}$ is encrypted using the personality object's public key to produce $A_{CO}$ 90.

The controller object 12 adds $A_{CO}$ 90 to the message request 82, session indices 84, time stamp 86, and expiration 88 and sends all five pieces of information packed together in the message 80 to the personality object 10. The personality object 10 verifies both that the message 80 was sent by the controller object 12, and that the message contents 82 through 90 have not been tampered with. This is accomplished by performing an independent one-way hash of the unpacked message request 82, session indices 84, time stamp 86, and expiration 88.

The personality object 10 decrypts $A_{CO}$ 90 with the session key $K_S$ to produce $H_{PO}$. Optionally, if the personality object is unauthenticated, the personality object 10 decrypts the authentication stamp 90 with its private key. If $H_{PO}$ is the same as $H_{CO}$, then the message 80 is authenticated. Otherwise it is not and the personality object 10 should refuse the request. Likewise, if the message 80 is authenticated but the time stamp 86 has expired, the personality object 10 should refuse the request. Additionally, the personality object 10 may choose to examine the event chain using indexes 84 to make sure the sources of service/event request are from authenticated personality objects 10 with suitably high standards.

Security Contexts

The implementation details of message 80 authentication are preferably transparent to the developer when an object security context is used. The goal of the context is to hide security details and make the calls between objects 10, 12 resemble direct method invocations. The security context for a personality object 10 would therefore provide the same interface to the controller object 12 as direct calls to the controller object 12, store secret session keys, optionally access controller object 12 public keys, supply time stamps 86 as needed, supply expirations 88 as needed, authenticate the controller object 12, create session keys 84, pack and unpack data, compute and validate authentication stamps 90 as needed, and/or reject unauthenticated communications 80. An example is provided by Moltenman::InitCommunications() in the appended source code. Security contexts may be supplied by trusted third parties in order to ensure compatibility between objects 10, 12.

Correspondence Authentication

Authenticated personality objects 10 preferably always supply an authentication stamp 90 with each outgoing message 80. Otherwise the controller object 12 marks them as unauthenticated, at least for that transaction or event chain. Similarly, unauthenticated objects 10 need not compute an authentication stamp 90 for outgoing messages since it will be ignored; this reduces computational costs.

By default, the controller object 12 computes an authentication stamp 90 only for authenticated objects 10. However, authenticated or unauthenticated personality objects 10 may override this default policy by registering their need for an authentication stamp 90. For instance, an unauthenticated personality object 10 may seek to authenticate itself, even though it does not need authenticated correspondence, for the sake of other resident personality objects 10 that do require authenticated correspondence 80. Likewise an unauthenticated personality object 10 may still be interested in having its incoming messages 80 authenticated by the controller object 12 using the unauthenticated key $K_U$.

Hashing, Encrypting, Decrypting

There exist many server APIs such as GSS that provide similar security services to those discussed above, and supply rigorous hashing, encrypting and decrypting functions. These functions are preferably hard-linked at compile time for improved security. In some cases, less rigorous and less expensive "lightweight" hashing, encrypting and decrypting functions are more desirable due to increases in efficiency, even if the risk of isolated security breaches increases moderately.

Registration and Session Indexes

The controller object 12 assigns a unique session index 84 to each personality object 10 that enters the scene 18. This is similar to use of CORBA Authenticated IDs, as described in Orfali et al., "The Essential Distributed Objects Survival Guide," Wiley 1996. However, both authenticated and unauthenticated objects 10 are assigned a session index. The session index indexes a table of public information about a given personality object 10, such as its ID. Only the controller object 12 has direct access to the table. Any object 10 may use a session index to retrieve any piece of public information it needs by making an appropriate request to the controller object 12.

After the session index is assigned, the personality objects 10 register requests for resources and services. Typical resources might include the ability to operate during otherwise idle time, or the ability to gain privileged access to methods of other objects 10.

Registration serves two main purposes. First, it provides greater efficiency since the controller object 12 knows only to provide those services an object needs, instead of being called on to provide all services to all objects 10. Second, registration provides the ability to enforce limited or restricted access to certain resources. For example, an unauthenticated object may be given only restricted access privileges to other objects 10.

Conventional ORBs employ access control lists to provide secure access to computer resources. The present invention extends access control lists to provide explicit support for personality object restrictions and provisions. Upon receiving a session index, personality objects may register request(s) for the following: need for personality object services, need for authenticated messages, need for association control, need for proximity control, global restrictions, and/or global provisions.

In the appended source code, the personality object 10 makes these needs known when the controller object 12 calls Moltenman::GetSecurityRequest(). Many of the flags set in the SecurityRec imply that the controller object 12 will call a specific method of the personality object 10 when it needs the information. For example if the flag kRequestActiveProxControl is set, then the method PersonalityObject::AllowProximity() will be called whenever another object 10 overlaps the first object 10. The personality object 10 being potentially violated can then make additional queries, such as what body parts are involved, to make a more refined decision how to react. This is illustrated by PersonalityObject::GetBodyPartIntersection() and enum BodyPartType in the appended code.

Access levels may also be defined. In the appended code, the function GetAccessType() is called for each personality object 10 and security service requested by GetSecurityRequest(). This allows the personality object 10 to scrutinize all ID information as a whole instead of setting bit types. For example, full frontal nudity (kFullFrontalNudity) and full sexual contact (kFullSexualContact) might normally be acceptable to a particular personality object 10, unless the personality depicted is a child (kChild), in which case nudity and sexual contact are unacceptable. This GetAccessType() function also allows the personality object to assign special access rights such as direct access, custom levels, and custom callbacks tied to specific event classes.

IDs

Figure 6:
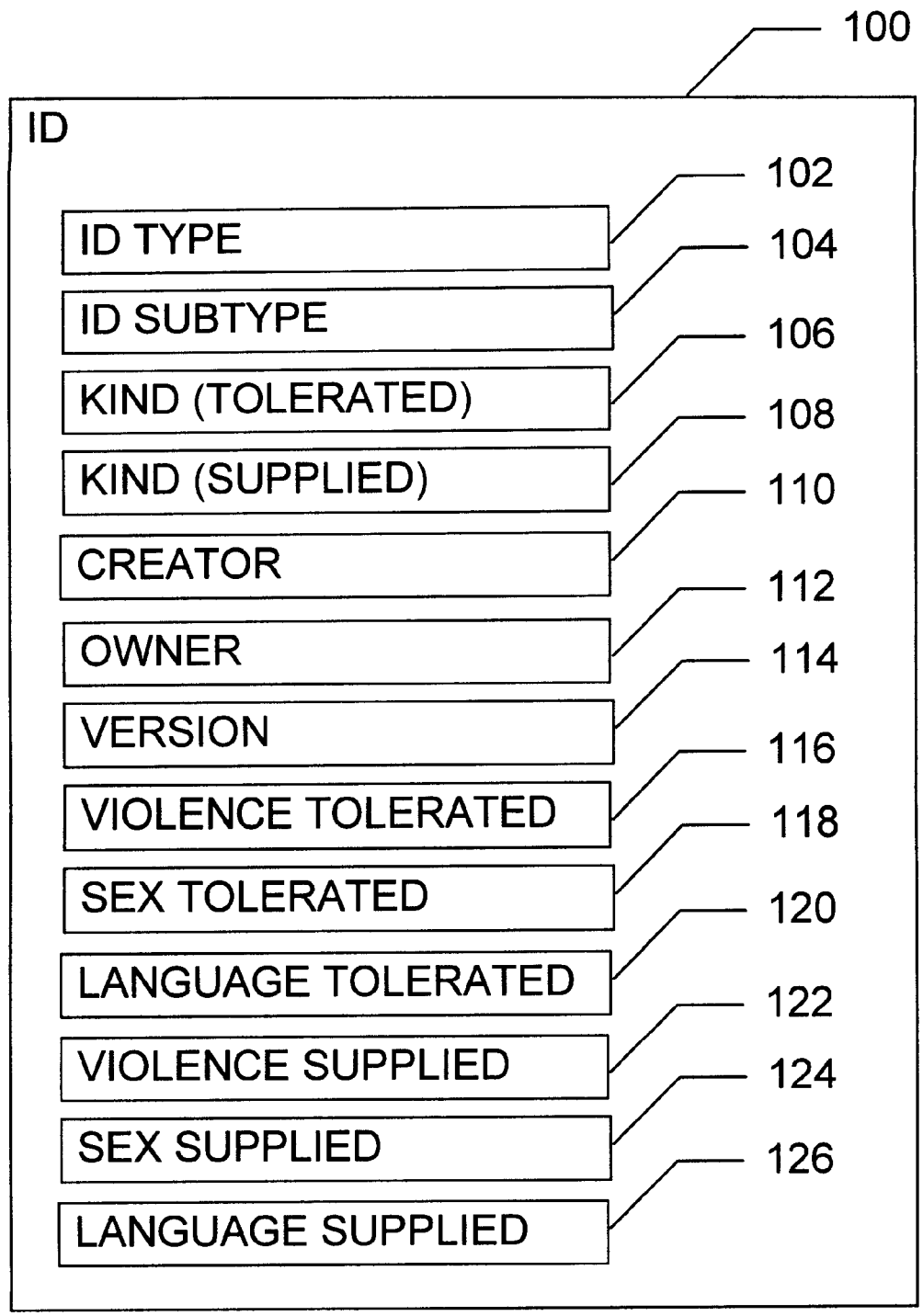
FIG. 6 is a diagram illustrating an object identification according to the present invention.

FIG. 6 illustrates one embodiment of an object 10, 12 ID 100. The ID 100 provides a variety of information about the object 10, 12, such as an ID Type, ID Subtype, Kind, Creator, Owner, Version, Violence Indexes, Sexual Indexes, and/or Language Indexes, in fields such as the fields 102 through 126. Although the ID 100 is preferably not empty, one or more of the fields 102 to 126 may be omitted in alternative embodiments.

Personality object IDs 100 serve several purposes. They provide semantic information to other potentially interacting personality objects 10 as a basis for decisions about the level of interaction. They provide the controller object 12 with semantic information for enforcing standards. They also provide the controller object 12 with semantic information about events to which the personality object 10 should respond.

For example, if the personality object 10 declares itself as not visible, then the controller object 12 will not send it any Draw events. This will also help the personality object 10 be more forthcoming about its ID 100 information. Efficiency is preferably enhanced by passive restrictions suggested by the "traits" and "tolerance" characteristics declared in the personality object identification record 100. Detailed information about one embodiment of ID 100 is provided in the appended code; see Moltenman::GetSecurityRequest() and the class definition of PersonalityObject.

The ID 100 contains two types of information, "Level" information and "Type" information. Level information in fields 106, 108, 116–126 suggests an increasing scale with minimum offense to the personality object 10 given the smallest number (zero). Only one level is set. Type information in fields 102, 104 is a set of bit flags that correspond to characteristics, with a bit flag set if the personality object characteristic exists, and clear if it does not. All the characteristics that apply are indicated by set flags.

A passive check for the controller object 12 to perform is straightforward and efficient: if (kLevelTrait>kLevelTolerance) then disallow interaction, and if (kTypeTrait & (! kTypeTolerance)) then disallow interaction, where & is bitwise AND and ! is bitwise INVERSE.

In the coding examples provided here, all personality objects 10 are created by subclassing the PersonalityObject class. Defaults are provide for all methods except GetIdentification( ), which retrieves the personality object's ID, and InitCommunication( ), which creates a secured connection to the controller object 12. Default behaviors are supplied for all other methods. As a general rule, the default values will make the personality object 10 as offensive as possible and as tolerant as possible (minimum security requirements). The defaults may be changed by supplying alternate values.

The semantic ID information 100 supplied by the personality object 10 is only useful to the extent that it can be trusted. The controller object 12 helps enforce veracity by making policy decisions (such as which events it will receive) based on ID 100 contents. A trusted third party may also validate the content of ID information 100. The ID 100 can then be validated by decrypting validationToken (see IndentificationRec in the code) using the rating company's public key and a one way hash on the ID 100. If the decrypted token and the hash match, then the ID information 100 is validated.

Some embodiments allow two levels of security. For example, two levels of proximity control are returned by PersonalityObject::GetSecurityRequest(), known as kRequestPassiveProxControl and kRequestActiveProxControl. Either of these may be set independently of the other. If passive proximity control is requested, then the controller object 12 prohibits personality objects 10 from overlapping unless the tolerance levels specified in the respective IDs 100 are met. The personality object 10 that is possibly being infringed never has the chance to accept or reject.

By contrast, if active proximity check is requested then the possibly infringed object's method AllowProximity() is called to place the possibly infringing object 10 under additional scrutiny. If both active and passive proximity controls are set, then only those personality objects 10 that pass the passive proximity test are given the opportunity to face the active proximity test.

With regard to global provisions and restrictions, it should be noted that one way a malign object 10 might try to dupe another into compromising its standards is to use an benign third party 10 which is overly tolerant. If the malign object 10 gain controls of the third party 10 and funnels messages 80 through it, an unsuspecting personality object 10 may unwittingly cooperate because the message 80 came from a benign personality object 10.

To prevent such interaction the user can set the following global flags: kDisallowDirectAccess (no direct/unbrokered communication), kDisallowUnlimitedAccess (cannot override passive restrictions), kEnforcePassiveChecks (require all objects to meet all passive checks), kRequestPassiveEventLogCheck (controller object 12 weeds out all messages that contain a bad controller object 12 somewhere in the event chain), kRequestActiveEventLogCheck (allow personality object 10 to check the event log itself), kEnforceMessageAuthentication (require the controller object 12 to create an authentication stamp for all messages, making it harder to compromise communication channels), and kEnforceStandardInteraction (accept only standardized and/or authenticated events).

These options make it much harder for one object 10 to masquerade as another, at an efficiency cost. All personality objects 10 that request it (by setting the flag kRequestActiveGlobalCheck) are given the opportunity to veto changes in global provisions. The particular controller object 12 determines how to handle conflicting desires of personality objects 10, according to strategies such as "first come first served," "democratic vote," "most restrictive wins," "let the user decide," and "most efficient wins."

Controller Object Enforcement

The controlling object 12 is the master controller of all communication in a dynamic environment 18 that may contain many personality objects 10 produced by different companies and having different requirements. A controlling object 12 may implement as many or as few provisions of the present invention as desired. The cost of implementing too few provisions is that the personality objects 10 with stricter security requirements will refuse to interact with a overly permissive controller object 12. The price of enforcing strict adherence to all provisions is the computational, programming and other costs arising from increased complexity. Controller objects 12 are preferably flexible to provide a safe environment 18 for as many personality objects 10 as possible while making the security arrangements as transparent as possible.

Typically, the controller object 12 brokers all communications between objects 10 in the scene 18. In some circumstances, this requirement may be overly inefficient if two personality objects 10 require a large amount of information sharing and message passing. Thus, a controller object 12 may permit two or more personality objects 10 to communicate directly (as over channel 24 ) if all objects 10 involved agree. A group of objects 10 that communicate directly are called a personality object cluster.

However, permitting clusters is less secure and requires special precautions. The controller object 12 must consider any secret information shared between itself and a personality object 10 in a cluster to be fully shared with all other personality objects 10 within the cluster. Therefore, the controller object 12 must add the session indices of all objects 10 in a cluster to each message, even if only one of the objects 10 in the cluster is involved. The controller object 12 should not permit a cluster unless it is prepared to give each object 10 in the cluster all the access rights of any other object 10 in the cluster.

The protocol outlined above has several advantages. It is not necessary for every personality object 10 to authenticate every other personality object 10 and establish separate security contexts. The personality object 10 and controller object 12 authenticate once and every other object 10 can then use this information, unlike standard peer-to-peer distributed object architectures. In addition, many personality object standards are passively enforced by the controller object 12, promoting efficiency and scalability. Transparency is also promoted; by subclassing a personality object 10, a developer receives a workable model right from the start. The security context hides all the security details, allowing as little or as much security as needed with minimal impact on the implementation of personality objects 10.

Association Control

Figure 7:
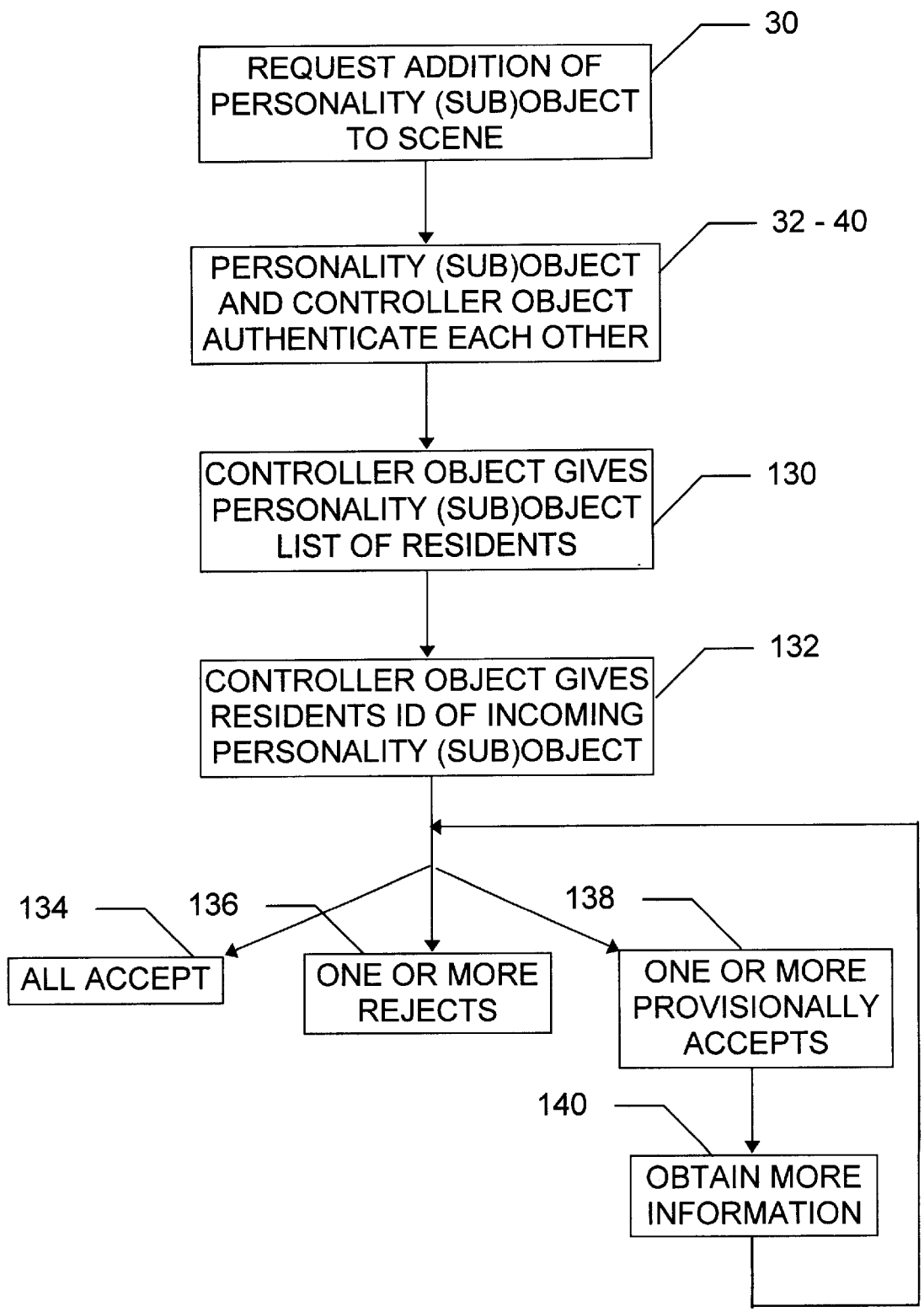
FIG. 7 is a flowchart illustrating an association control method of the present invention.
Figure 8:
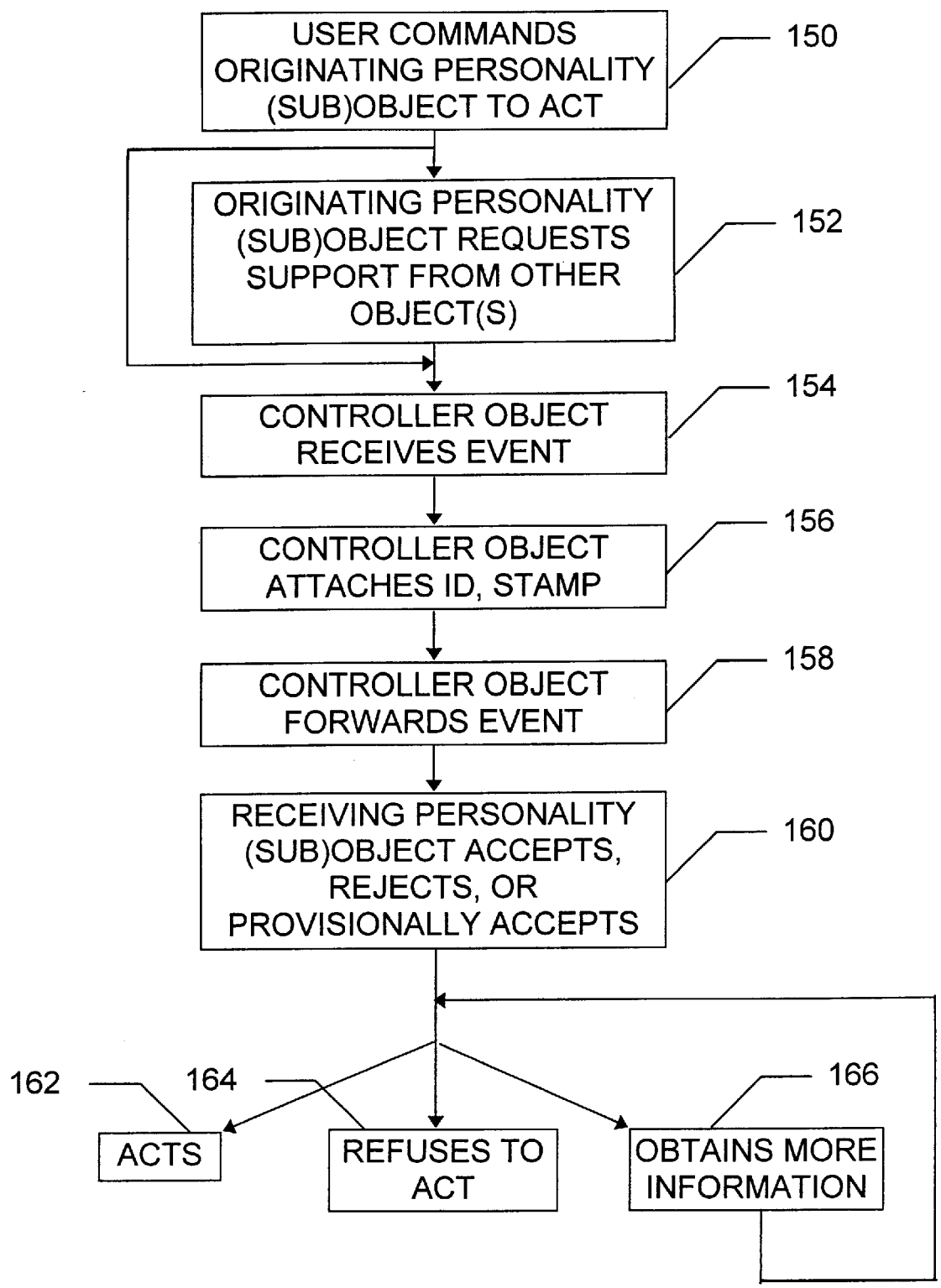
FIG. 8 is a flowchart illustrating an event control method of the present invention.

Reference is now made to FIGS. 1 and 7. Before a personality object 10 or subobject 26 may enter the scene 18, an identification and authorization process occurs. The incoming personality object 10 or subobject 26 must identify itself to the controlling object 12. If it is a subobject 26, it must tell the controlling object 12 which object 10 it intends to associate with. For instance, a "deep voiced" text-to-speech voice subobject may wish to attach to a particular personality object 10. The incoming subobject 26 is preferably also given a list of all independent objects 10 and subobjects 26 within the scene 18. The entering (sub)object 10, 26 may then approve or disapprove of being in the scene 18.

Likewise, the objects 16 that are currently in the scene 18 may approve or disapprove of the new entry 20. If any object 16 already in the scene 18 disapproves, the personality object or subobject 20 does not enter the scene 18. In general, association control proceeds as follows:

1. A user makes a request to add a personality object 20 to a scene 18 during step 30.
2. The requested personality object 20 and controlling object 12 go through the authentication procedure described above in steps 32 through 40 (FIG. 2), resulting in the incoming personality object 20 receiving an "authenticated" or "unauthenticated" mark.
3. During a step 130, the controlling object 12 provides the incoming personality object 20 with a list of all personality objects 16 currently residing in the scene 18. The list contains the controlling object's copy of the personality objects' respective identifications 100 (FIG. 6).
4. During a step 132, the controlling object 12 also distributes a copy of the ID 100 and authentication stamp 90 of the incoming personality object 20 to all of the personality objects 16 currently residing in the scene 18.
5. Once the resident and incoming personality objects 10 have this information, they have the option to reject by a step 136, accept by a step 134, or provisionally accept by a step 138. If all personality objects 10 accept, then the personality object 20 enters the scene 18. If one or more personality objects 10 reject, then the personality object 20 does not enter the scene 20.
6. If one or more personality objects 10 give provisional acceptance and all others accept, then the provisionally accepting object 10 requires more information before accepting or rejecting. This information is obtained during a step 140. Under rules of provisional entry, the provisionally accepting object 10 is preferably allowed to make brokered requests to the controller 12 to receive additional information from any object 10 it chooses. The rules governing requests for additional information are provided below in discussions of events and provisions. The incoming personality object 20 may refuse to enter the scene 18 or to perform selected actions until all personality objects 10 give acceptance.

Event Control

An object 10 may approve of an association but still disapprove of a particular event. For example, a text-to-speech object 10, 26 may disapprove of saying certain words. Current ORB implementations provide substantial security support for how and when events are processed. However, current implementations lack the concept of constraints on the semantic content of events. For example, the event "move arm" may appear innocent enough by itself, but if the event carries the semantic meaning "strike lethal blow" then it may be a restricted event.

The present invention provides an architecture to convey the semantic content of an event, referred to as a "personality semantic event." The architecture of the invention provides several means to establish the semantic content of an event.

One means is source authentication. In many cases the most important information about an event is which object 10 initiated the event. The ID 100 and authentication stamp 90 of the originating object 10 are preferably attached to any event (or request) that is passed to another object 10. In many instances, knowing that the event came from a reputable object 10 is enough semantic information to determine if action should be taken.

If knowledge of the originator is not enough, specific semantic rating information may be provided in the ID information 100 of any personality object 10. If an object 10 is reputable and authenticated, then another object 10 will be able to believe the semantic information which the authenticated object 10 provides about itself. "Semantic rating" comprises the use of identifying fields such as the fields 102 to 126 associated with personality objects 10. Values in the identifying fields may be used in determining the semantics of an interaction. As illustrated in FIG. 6 and the text herein, suitable identifying fields and sample values include:

ID Type (Molten Man)
Subtype (Malibu Molten Man)
Kind (Adult male, hero)
Creator (Acme Toy Company)
Owner (Acme Toy Company)
Version (1.2)
Violence index (5 out of a possible 10)
Sexual content index (2 out of a possible 10)
Language index (2 out of a possible 10)

The indices 114 to 126 rate the personality object on the level of violence, sexual content, and language it is willing to tolerate or to supply, as with movie rating systems. Higher index ratings imply higher levels of tolerance or supplied content. Other context specific indices and information may also be provided. In an alternative embodiment, ratings indicate the highest level of particular content that the personality object 10 supplies.

An authenticated object 10 will be able to convey trusted rating information based on the authentication. Given rating information, and with reference to FIGS. 1, 5, 6 and 8, the following method may be employed to use semantic information about an event:

1. During a step 150, the user issues a supported command to an originating personality object 10.
2. If the originating personality object 10 requires support from an associated personality object 10, then the originating personality object 10 issues an event (or request) for action during a step 152.
3. During steps 154 through 158, the controlling object 12 receives the event, attaches the ID 100 and authentication stamp 90 of the originating personality object 10 to the event, and then hands the event to the appropriate receiving personality object 10.
4. During a step 160, the receiving personality object 10 checks the ID 100 and authentication stamp 90. It may then accept, reject, or provisionally accept. As in the case of the association control method discussed above in connection with FIG. 7, a provisional acceptance allows the receiving personality object 10 to make brokered requests for information (during a step 166 ) before making a final determination how to respond to the event request.
5. If the receiving personality object 10 accepts the event, then the receiving personality object 10 takes appropriate action by a step 162. The receiving personality object 10 may, in turn, issue events of its own to other personality objects 10. The controlling object 12 will take the new events, add the receiving personality object's ID and authentication stamp, and log and distribute the events during repeated steps 154 to 158. This creates an audit trail of all the intervening personality objects 10 in the event passing chain.
6. If the receiving personality object 10 rejects the event, then the action is terminated by a step 164.

Proximity Control

A personality object may allow another personality object to share the same scene but require that the other personality object not enter its "personal space," in a manner analogous to personal distances maintained by people in the real world. People and personality objects both guard against unwanted physical contact, particularly contacts of a sexual or violent nature. In some cases, personality object proximity restrictions will only apply to certain body parts, or certain combinations of body parts.

Figure 9:
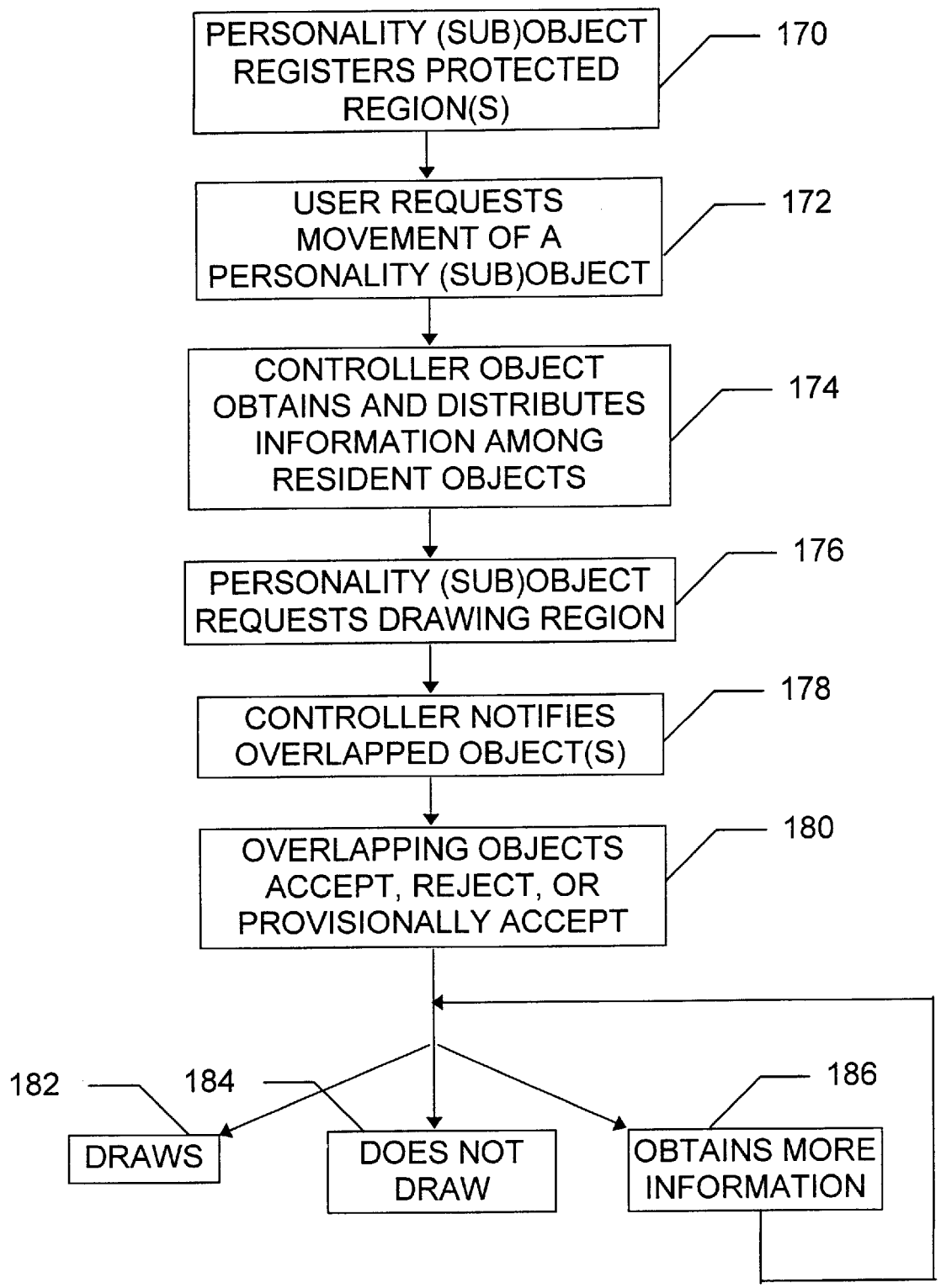
FIG. 9 is a flowchart illustrating a proximity control method of the present invention.

With reference to FIGS. 1 and 9, the following method of the present invention provides such proximity checks:

1. Personality objects 10 may register "protected" regions during a step 170. The protected region does not necessarily coincide with the visible contours of the object 10.
2. During a step 172, a user makes a request to move a personality object 10 in the scene 18.
3. During a step 174, the controlling object 12 executes the same mechanisms as outlined above in connection with association control (FIG. 7), but utilizes additional information such as the distance between objects 10 and parts 26 of objects.
4. During a step 176, the personality object 10 requests a drawing region (either two-dimensional or three-dimensional) in which it wishes to draw in response to the user's request. The personality object 10 will be forced, through clipping, masking, or similar constraints, to draw only in the requested region if the request is approved by the controlling object 12.
5. Personality objects 10 are notified by the controlling object 12 during a step 178 if their protected region is or will soon be overlapped by the protected region or drawing region of another personality object 10.
6. Once notified, the personality object 10 involved has the right to accept, reject, or provisionally accept an intrusion upon its protected region during a step 180. Depending on the decisions made by the objects 10, 26 involved, the requested object 10 draws (step 182) or does not draw (step 184). Provisional acceptance leads to more information flow during a step 186, as described above.

Shown below in C++ and pseudocode is one detailed method for allowing personality objects 10 to create and control intrusions on protected regions. Another approach is shown in C++ code later in this document. This method is implemented as an invokable procedure (a "method," as that term is used in object-oriented computer programming) of the controlling object 12. In conjunction with the method, personality objects 10 register their "drawing region" and their "protected regions", which may, in general, be different, overlapping, or identical regions. Access tokens are generated during the authentication process described elsewhere herein, and the controller object 12 maintains a list or table of access tokens.

```
//-----------------------------------------------------------
// CheckRegionOverlap
//
// This method is called when ever an object is moved
// within a scene
//   - return:      true if passes check, otherwise return false
//   - movedObject: input, object that has moved
//-----------------------------------------------------------
Boolean
ControllerObject::CheckRegionOverlap( Object movedObject )
{
// Retrieve access token(s) from Controller Object's
// internal list
    Boolean allowOverlap = true;
    AccessToken movedToken = this->GetAccessToken(movedObject);
    AccessToken objToken;
// The moved object lets the controller object know which
// properties it wishes to check (if any). For example, the
// object may only be interested in other animated objects
// that overlap. Inanimate objects (couch, clothes, etc.)
// may be catagorically OK
    Property searchProperties =
        movedObject->GetOverlapSearchProperties(movedToken);
// Create iterator object. In addition to the requested
// search properties, all objects that have protected
// regions are added to the search list. This list
// may be empty.
    ObjectIterator iter(
        this->fObjectList,
        searchProperties | pRegionProtectedObjects );
// iterate list of animated objects
    for ( obj = iter.FirstObject(); obj != NULL && allowOverlap;
            obj = iter.NextObject() )
    {
        // get access token
        objToken = this->GetAccessToken( obj );
        // check for intersection of protected regions with
        // drawing regions
        if (
            InterSect (
                movedObject->GetProtectedRegion(movedToken),
                obj->GetDrawableRegion(objToken) )
                            != EmptyRegion()
            ||
```

```
                        -continued

InterSect(
            movedObject->GetDrawableRegion(movedToken),
                obj->GetProtectedRegion(objToken) )
                    != EmptyRegion()
    )
        {
            // Overlapping objects are given the opportunity
            //to accept, reject, or make brokered requests for
            // more information. If either rejects, the move
            // operation is not performed by Controller Object
            allowOverlap =
                this->AllowRegionOverlap( obj, movedObject );
        }
    } // end for
    return allowOverlap;
}
```

Interaction Control

Examples of interaction between personality objects 10 are too numerous to catalog. As an illustration, however, one personality object 10 may deliver a punch while another personality object 10 receives the blow and reacts by moving away from it, by punching back, or by delivering a stern lecture.

Interactions are controlled in manner similar to the control exercised over events. Personality semantic events help define proper interactions and provide a context for meaningful restrictions, in conjunction with the following method:

1. A user makes a request for an event involving two or more personality objects 10.
2. The controlling object 12 executes the same mechanisms described above in connection with event control, and the personality objects 10 involved are given the opportunity to spawn events or interactions, which are in turn subjected to the same controls as the original event.

In one embodiment, each personality semantic event is equivalent to a personality subobject 26 in that each semantic event has an ID 100 and may be authenticated. Semantic event IDs 100 may contain rating information independent of the personality object 10 that uses the semantic event. This allows groups of personality object 10 developers to create standard suites of events with ratings given to each individual event.

Authenticating the event allows the personality object 10 to extract very exact semantic meaning in addition to knowing who sent the event. It also permits highly integrated actions and reactions between personality objects 10. Accordingly, the semantic event itself may also be given the rights to apply restrictions just like any other personality object 10, 26, if it chooses to do so.

Distribution Control

Conventional ORB objects provide various levels of licensing control. The present invention extends these services to meet the particular needs of distributing personality objects 10. For example, certain personality objects 10 may not allow the creation of a QuickTime movie because doing so would conflict with the movie making subsidiary of the character owner. Other personality objects 10 may require a watermark, while still others may disallow large scale distribution such as distribution over a computer network 14 or placement on a bulletin board system 14.

A wide variety of parameters may be used to control distribution methods (or association methods or other methods taught herein). Suitable parameters include the following, in addition to those mentioned elsewhere herein: user ID, hardware being used, software being used, date, time, geographic location, network address, available system 14 resources, and any other parameter which can be determined by the controlling object 12 and/or by a personality object 10.

Distribution control may include obtaining a user's consent to gather information that would be useful in tailoring products or services to meet the needs of the user in question and then transmitting that information to a central location.

To discourage unauthorized use of bitmaps generated by a personality object 10, facilities for creating "screen shots" or "screen dumps" may be temporarily disabled while a personality object 10 is present in the scene 18.

Figure 10:
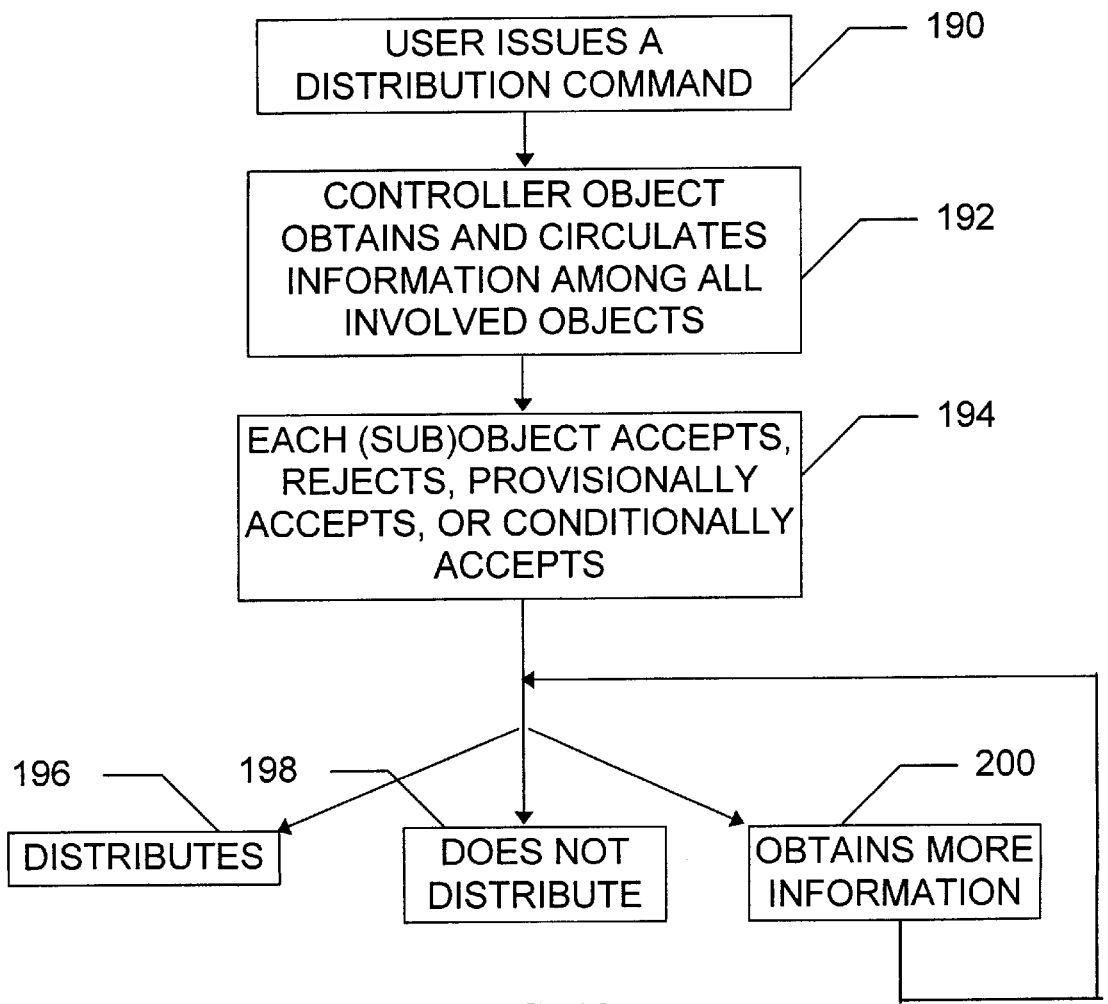
FIG. 10 is a flowchart illustrating a distribution control method of the present invention.

With reference to FIGS. 1 and 10, distribution control proceeds according to the following method:

1. During a step 190, the user issues a distribution command supported by the controlling object 12, such as "save as QuickTime movie."
2. During a step 192, the controlling object 12 passes information regarding the requested distribution to all personality objects 10 associated with the scenes 18 to be exported.
3. Each personality object 10 may then may accept, reject, provisionally accept, or conditionally accept during a step 194. As with the methods above, a provisional acceptance allows the receiving personality object to make brokered requests for information during a step 200 before making a final acceptance or rejection decision.
4. By conditional acceptance, any personality object 10 may require the inclusion of an additional object 10 or subobject 26 in the distribution object, such as a visible watermark. In this case, if all personality objects 10 accept the inclusion, distribution is allowed by a step 196; otherwise the action is terminated by a step 198.

Provisions

Unlike a control or restriction that prohibits certain actions, a provision defines required auxiliary actions, objects, events and so forth that are needed to remove restrictions. For example, a certain personality object 10 may require that a visible watermark be displayed in all movies or animations containing a recognizable image or sound of the personality object 10. This is done by spawning the insertion of an additional object 10 or subobject 26 into the scene when the personality object 10 is inserted.

Provisional restrictions may be used to indicate that a scene was not specifically sanctioned by the personality object's owner or creator, but was instead created by an outside user with a limited license for character use and distribution.

Provisional control proceeds according to the following method:

1. A user inserts a personality object 10 with a provisional restriction into the scene 18.
2. The personality object 10 spawns insertion of a provisional object 20 into the scene 18.
3. Both the personality object 10 and its provisional object 20 are passed through the standard control mechanisms described above in connection with association control.
4. If either the personality object 10 or its provisional object 20 is rejected by one or more objects 16 in the scene, then placement of the personality object 10 is rejected.

A personality object 10 that enters a scene may request "strict observance" of posted personality object ratings. Under a strict observance provision, no personality object 10 will receive an event that is outside its declared tolerance.

Thus, if a personality object 10 declares that its highest sexual tolerance rating is 5, the controlling object 12 will not deliver any event that is rated as a 7. Without strict observance, the personality object 10 would be given the event anyway and allowed to decide for itself.

Strict observance forces personality object developers to be candid about their ratings. If they plan to accept highly sexual or violent events, they must say so. Thus, personality objects 10, 12 will get more reliable semantic information about the personality objects 10 they deal with.

Summary

In summary, the present invention supports the definition, authentication, and enforcement of constraints on speech, appearance, movements, associations, and other properties that are used to suggest or exhibit the personality traits and behaviors of personality objects 10. The controlling object 12 and personality objects 10 run in any of a wide range of software and hardware environments 14. The invention provides an architecture sufficient to guide those of skill in the art in authenticating objects 10, 12, controlling associations between objects 10 and subobjects 26, controlling events involving one or more objects 10, controlling the proximity of personality objects 10 to one another, controlling the distribution of objects 10, 12, 26, and mandating the use of auxiliary objects 10, 26 under specified circumstances.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines and/or to perform action implementation of the present invention substantially as described herein.

Those of skill will appreciate that steps in methods of the invention may be omitted, performed in a different order, or performed concurrently, subject to the requirement that claimed steps cannot be omitted for purposes of literal infringement analysis, and that steps which depend on the results of other steps must be performed only after the required results are available.

Those of skill in the art will also recognize that an embodiment of the present invention need not include all parts of the architecture described above. The invention may be embodied in other specific forms without departing from its spirit or essential aspects. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing personality manifestation by an object in a scene on a computer system, the computer-implemented method comprising the steps of:

providing a first object, the first object being a controller object in that it has semantic information about the scene or about other objects in the scene, the controller object having a controller object identifier;

providing a second object, the second object being a personality object in that it encapsulates personality traits or behaviors of a character, the personality object having a personality object identifier;

establishing a communication channel between the personality object and the controller object;

exchanging the identifiers across the communication channel; and determining personality manifestations in the form of personality object actions at least in part on the basis of the exchanged identifiers, the character personality trait or behavior encapsulated in the personality object, and semantic information of the controller object.

2. The method of claim 1, wherein the identifiers include authentication information and the determining step is preceded by the computer-implemented step of having each object use the authentication information in the other object's identifier to authenticate the other object.

3. The method of claim 1, further comprising the step of specifying an access level to be enforced during the determining step.

4. The method of claim 1, wherein the step of determining personality manifestations in the form of personality object actions comprises determining whether the controller object will allow the personality object to enter the scene.

5. The method of claim 4, wherein the determining step further comprises determining whether the controller object will allow the personality object to associate itself with another personality object that is already resident in the scene.

6. The method of claim 1, wherein the step of determining personality manifestations in the form of personality object actions comprises determining whether the controller object will allow the personality object to perform a requested event.

7. The method of claim 6, wherein the determining step utilizes source authentication.

8. The method of claim 6, wherein the determining step utilizes semantic rating information.

9. The method of claim 8, wherein the semantic rating information indicates the content a personality object will tolerate.

10. The method of claim 8, wherein the semantic rating information indicates the content a personality object will supply.

11. The method of claim 1, wherein the determining step comprises determining whether the controller object will allow two personality objects to interact through a series of events.

12. The method of claim 1, wherein the step of determining personality manifestations in the form of personality object actions comprises determining whether the controller object will allow the personality object to enter a protected region of another personality object.

13. The method of claim 1, wherein the step of determining personality object actions comprises determining whether the controller object will allow the personality object and the scene to be distributed.

14. The method of claim 13, wherein the controller object allows distribution subject to conditions based on predetermined distribution parameters.

15. The method of claim 1, wherein the step of determining personality object actions comprises determining whether the controller object will enforce provisional restrictions requested by the personality object.

16. The method of claim 15, wherein the personality object requests strict observance of personality object ratings.

17. The method of claim 1, wherein a first personality object requests an action through the controller object, and the determining step comprises obtaining a rejection or an acceptance from a second personality object.

18. The method of claim 17, wherein the determining step comprises obtaining a rejection, an acceptance, or a provisional acceptance from the second personality object.

19. The method of claim 18, wherein the determining step comprises obtaining a rejection, an acceptance, a provisional acceptance, or a conditional acceptance from the second personality object.

20. A system for managing personality manifestations by one or more personality objects which encapsulate the personality traits and behaviors of proprietary characters within a computer-based animation system, comprising:

a computer system having a display device and a memory;

a scene on the computer system, at least part of the scene displayed on the display device based on data in the memory; and personality manifestation controlling means for controlling the manifestation of character personality by at least one personality object with respect to the scene by communication between a controller object and the personality object, whereby the system prevents at least some unauthorized manipulations of proprietary animated characters which could otherwise damage the public image or commercial prospects of the characters' owners.

21. The system of claim 20, wherein the controlling means comprises means for performing association control.

22. The system of claim 20, wherein the controlling means comprises means for performing event control.

23. The system of claim 20, wherein the controlling means comprises means for performing proximity control.

24. The system of claim 20, wherein the controlling means comprises means for performing interaction control.

25. The system of claim 20, wherein the controlling means comprises means for performing distribution control.

26. The system of claim 20, wherein the controlling means comprises means for performing provision control.

27. A computer storage medium having a configuration that represents data and instructions which will cause at least a portion of a computer system to perform method steps for controlling a personality object, the method steps comprising the steps of:

providing a first object, the first object being a controller object in that it has semantic information about the scene or about other objects in the scene, the controller object having a controller object identifier;

providing a second object, the second object being a personality object in that it encapsulates personality traits or behaviors of a character, the personality object having a personality object identifier;

establishing a communication channel between the personality object and the controller object;

exchanging the identifiers across the communication channel; and determining personality manifestations in the form of personality object actions at least in part on the basis of the exchanged identifiers, the character personality trait or behavior encapsulated in the personality object, and semantic information of the controller object.

28. The computer storage medium of claim 27, wherein the step of determining personality manifestations in the form of personality object actions comprises determining whether the controller object will allow the personality object to enter the scene.

29. The computer storage medium of claim 27, wherein the step of determining personality manifestations in the form of personality object actions comprises determining whether the controller object will allow the personality object to perform a requested event.

30. The computer storage medium of claim 27, wherein the step of determining personality manifestations in the form of personality object actions comprises determining whether the controller object will allow the personality object to enter a protected region of another personality object.

31. The computer storage medium of claim 27, wherein the step of determining personality object actions comprises determining whether the controller object will allow the personality object and the scene to be distributed.

32. The computer storage medium of claim 27, wherein the step of determining personality object actions comprises determining whether the controller object will enforce provisional restrictions requested by the personality object.

* * * * *